Aug. 13, 1963 F. H. TENNIS 3,100,503
PILOT OPERATED PRESSURE AND VACUUM RELIEF VALVE
Filed Nov. 17, 1961 4 Sheets-Sheet 2
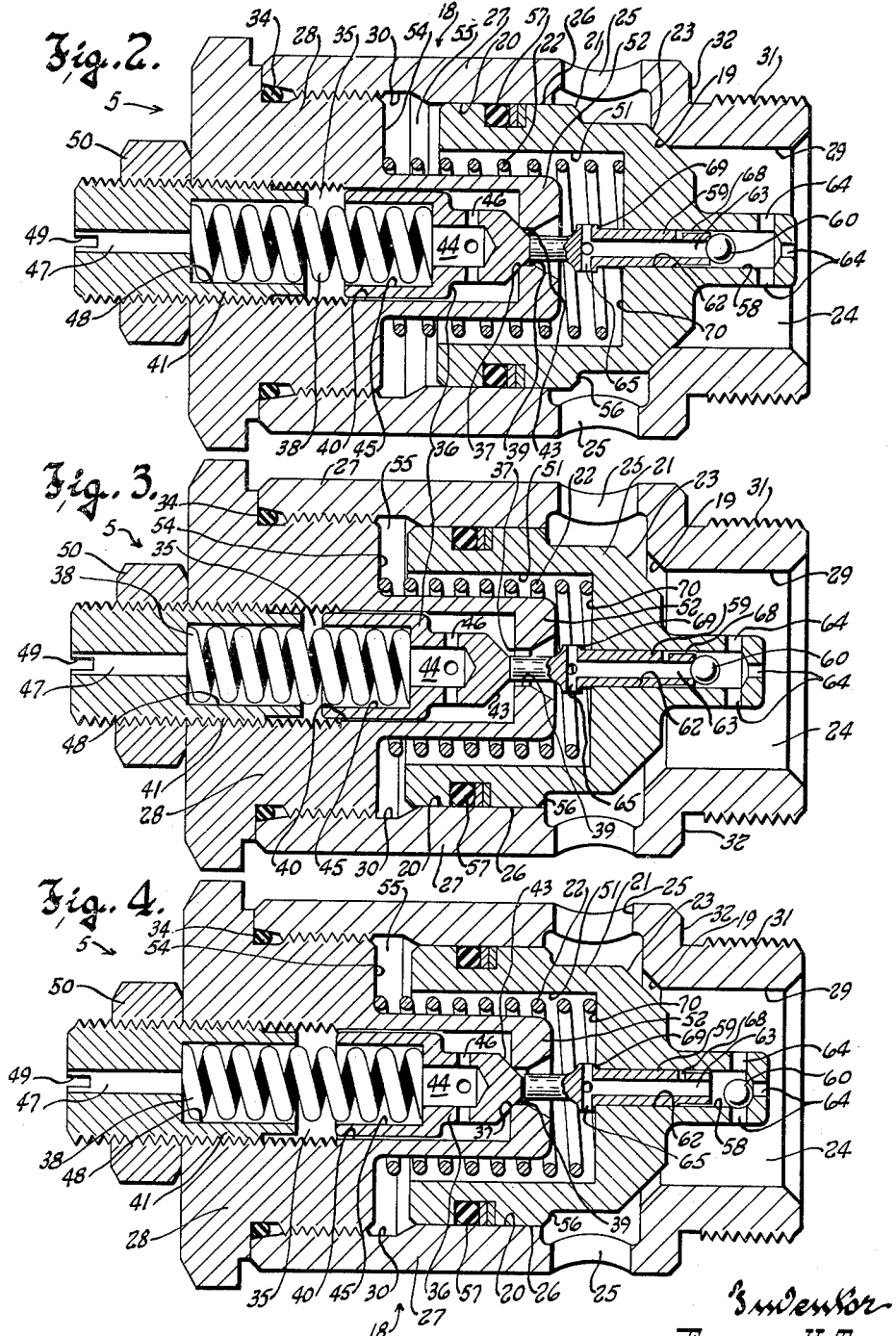

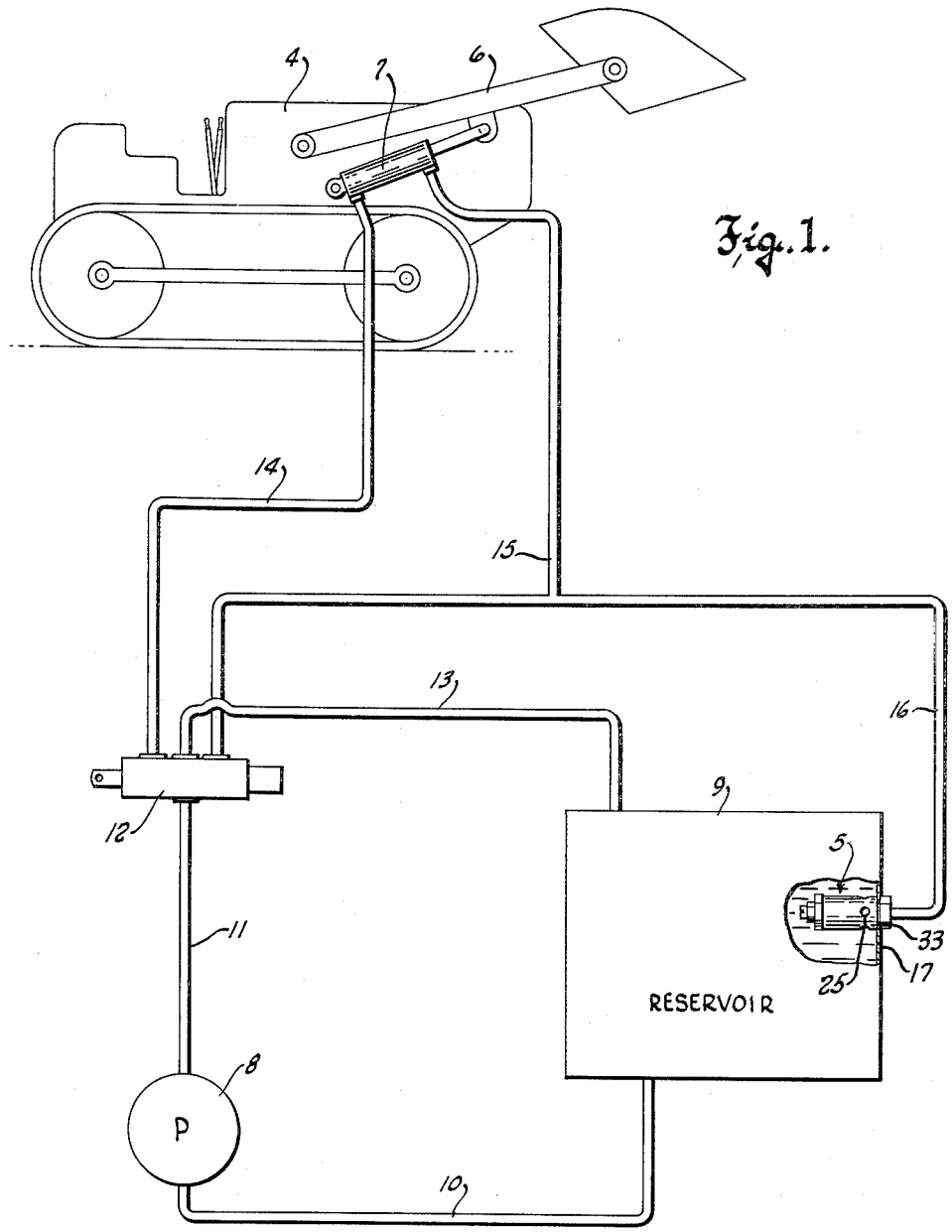

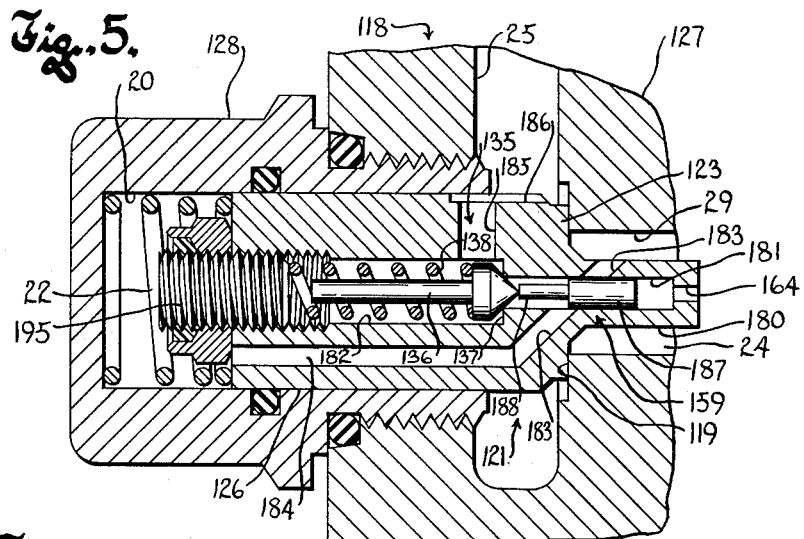
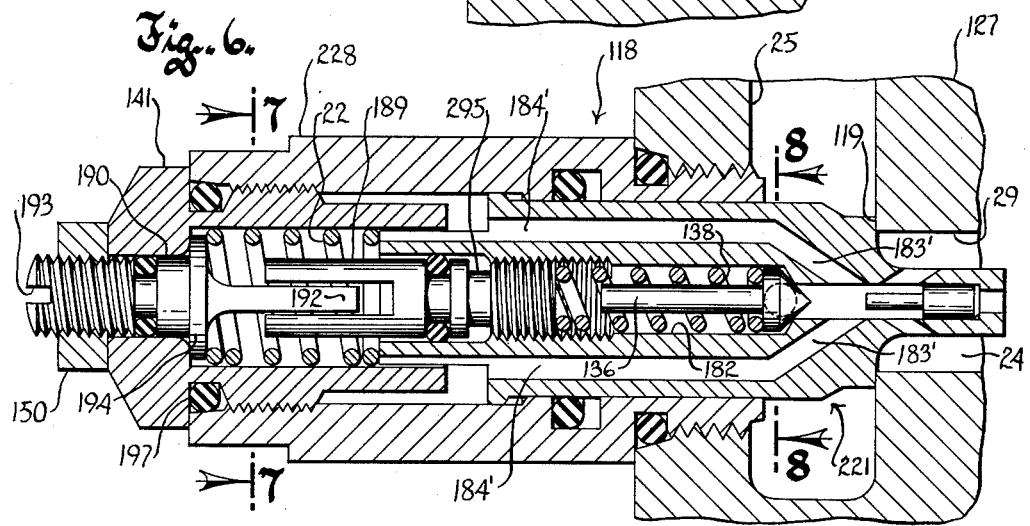
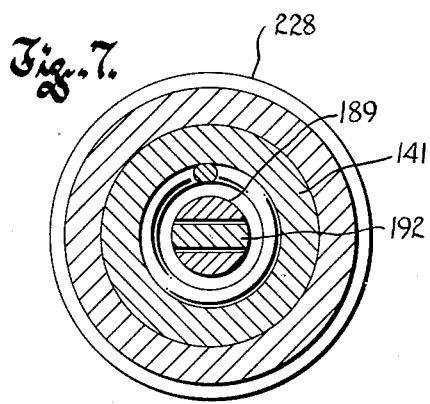
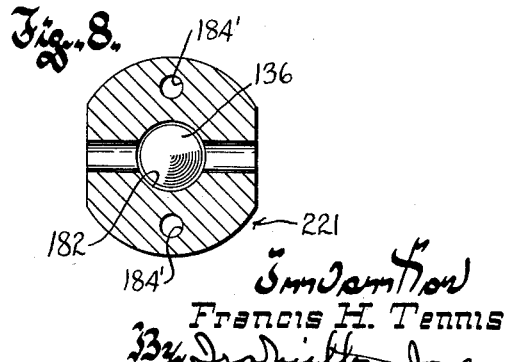

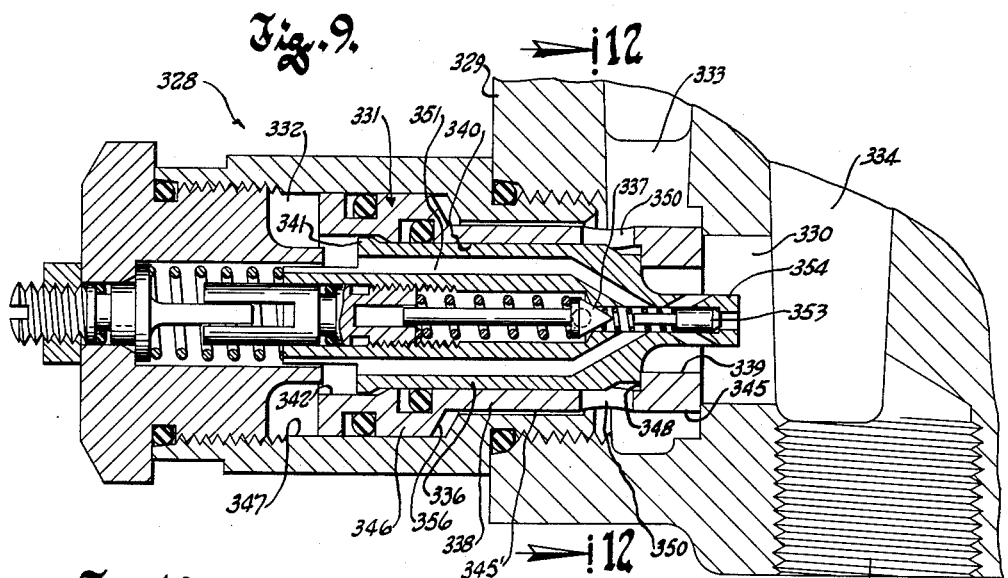

United States Patent Office 3,100,503
Patented Aug. 13, 1963

3,100,503
PILOT OPERATED PRESSURE AND VACUUM RELIEF VALVE
Francis H. Tennis, Milwaukee, Wis., assignor to Hydraulic Unit Specialties Company, Pewaukee, Wis., a corporation of Wisconsin
Filed Nov. 17, 1961, Ser. No. 153,415
24 Claims. (Cl. 137—491)

This application is a continuation in part of my copending application, Serial No. 151,416, filed November 6, 1961, as a continuation in part of my copending application Serial No. 72,892, filed December 1, 1960, now abandoned.

This invention relates to pilot operated relief valves for fluid pressure systems, and refers more particularly to a pilot operated valve which is adapted to open both at times when pressure of fluid in a system in which the valve is connected exceeds a predetermined high value and at times when such pressure falls below a predetermined low value.

Such a valve may be regarded as a combined pressure and vacuum relief or void control valve since it is usually so connected in a fluid pressure system that its opening effects communication of the system with a reservoir or other source of fluid which is unpressurized or at atmospheric pressure. Thus when system pressures are excessively high, the valve allows fluid from the system to flow to the reservoir, and when the pressure of fluid in the system falls below that of fluid in the reservoir the valve likewise opens to permit fluid from the reservoir to flow into the system.

Fluid pressures in the system which are below the static pressure of fluid in the reservoir may be regarded as "negative pressures," "voids" or "vacuums," since the reservoir pressure affords a reference value to which system pressures may be related. It is in this sense that the terms "negative pressure," "void" and "vacuum" are used herein.

In general it is an object of this invention to provide a combined pressure and vacuum relief valve which is especially well adapted for installation in hydraulic systems and which incorporates means for readily adjusting the high pressure value at which the valve opens.

It is a further object of this invention to provide a combined pressure and vacuum relief valve for a fluid pressure operated system having fluid supply and return lines that can be communicated through a relief port, defining an annular valve seat, wherein the valve comprises a body containing a main valve element which is cooperable with the valve seat to control communication therethrough between the supply and return lines, a piston behind the main valve element and connected therewith to actuate the same toward and from engagement with the valve seat, and a vent from the body space behind the piston controlled by a pressure responsive normally closed pilot poppet, wherein relief valve passage means through the piston and main valve elements permits substantially free flow of fluid from behind the piston through the relief port to the supply line when pressure in the supply line falls below that in the return line, to provide for smooth and positive unseating of the main valve element by which vacuum relief is effected, and wherein means are provided for opening the pilot poppet in direct response to a rise of fluid pressure in the supply line to a predetermined high value and for holding the pilot poppet open until such pressure falls below that value, so that the valve maintains system pressures accurately and operates without hunting of the pilot poppet or noisy chattering of the main valve element.

Another object of this invention resides in the provision of a combined pressure and vacuum relief valve having a pilot poppet, wherein the pilot poppet does not "crack" and effect reduction of system pressure until such pressure reaches the predetermined relief value for which the valve is set to open, and wherein the pilot poppet closes promptly when the system pressure falls back down to a value below that at which the valve is set to relieve.

It is also an object of this invention to provide a pilot operated valve having the above described desirable capabilities and characteristics but which is nevertheless simple and inexpensive to manufacture, rugged and dependable in operation, and capable of being easily mounted in a hydraulic system reservoir and connected with a pressurized portion of the system by a single duct.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate several complete examples of physical embodiments of the invention constructed according to the best modes so far devised for the practical application of the principles thereof, and in which:

FIGURE 1 is a diagram of a hydraulic system incorporating the valve of this invention, illustrating one type of installation for which the valve is adapted;

FIGURE 2 is a longitudinal sectional view of a valve of this invention shown in its normal closed position;

FIGURE 3 is a view similar to FIGURE 2 but showing the valve in the condition in which it relieves system pressures exceeding a predetermined high value;

FIGURE 4 is a view similar to FIGURE 2 but showing the valve in the condition in which it relieves negative system pressures;

FIGURE 5 is a longitudinal sectional view of a modified embodiment of the combined pressure and vacuum relief valve of this invention;

FIGURE 6 is a longitudinal sectional view of another modified form of valve embodying the principles of this invention;

FIGURE 7 is a cross sectional view taken on the plane of the line 7—7 in FIGURE 6;

FIGURE 8 is a cross sectional view taken on the plane of the line 8—8 in FIGURE 6;

FIGURE 9 is a longitudinal sectional view of a further modified form of relief valve embodying the principles of this invention, with the main poppet mechanism thereof in closed position;

FIGURE 10 is a view similar to FIGURE 9 but showing how the valve functions to relieve excessive system pressures;

FIGURE 11 is a view similar to FIGURE 9 showing how the valve functions to relieve vacuum in the system; and FIGURE 12 is a cross sectional view taken on the plane of the line 12—12 in FIGURE 9.

Referring now to the accompanying drawings, in which like numerals designate like parts throughout the several views, the valve 5 of this invention is adapted for installation in a fluid pressure system like that shown in FIGURE 1, which illustrates that portion of the hydraulic system of a front end loader 4 which provides for raising and lowering a boom 6. In such a system a pump 8 draws hydraulic fluid from a reservoir 9 through a duct 10, and forces such fluid under pressure, by way of a duct 11, to a control valve 12 which has a neutral position and a pair of operative positions. When the control valve 12 is in its neutral position, it effects return of fluid to the reservoir by way of a duct 13. In one operative position of the control valve it directs fluid from the pump, by way of a duct 14, to one side of a double acting cylinder 7 to effect extension of the piston rod of the cylinder and consequent raising of the boom 6 to which the cylinder rod is connected.

When the control valve is shifted to its other operative position it directs fluid from the dump to the other side of the cylinder 7, through a duct 15, to thus permit retraction of the piston rod and consequent lowering of the boom.

Since the boom is biased downwardly by gravity, fluid under pump pressure is supplied to the cylinder through a duct 15 in order to prevent drawing a void in that end of the cylinder from which the piston rod extends, as it is retracted during lowering of the boom. However, when the boom is heavily loaded it may descend so fast that the pump is unable to supply a sufficient volume of fluid to the cylinder, and in that event the relief valve 5 opens to permit the cylinder to draw the required additional fluid from the reservoir by way of a duct 16 which communicates the valve 5 with the duct 15. Moreover, if the pressure of fluid in the pressure system comprising the duct 15 for any reason rises above a predetermined value, the valve 5 opens to permit fluid to flow out of the duct 15, through the duct 16, to the reservoir. Such relief operation might be required, for example, if the front end loader illustrated in FIGURE 1 were moving forwardly with its boom elevated and the control valve 12 in its neutral or "hold" position, and the boom encountered an obstruction such as a wall which tended to force it upwardly. The upward force upon the boom, transmitted to the cylinder, might cause fluid pressure in the outer portion of the cylinder and in the duct 15 to rise to a value sufficiently high to rupture the cylinder or said duct if such pressure were not relieved through the valve 5.

Preferably the valve 5 is installed on a wall 17 of a fluid reservoir, to thus facilitate mounting of the valve and minimize the number of connections which must be made to it, but it will be apparent as the description proceeds that the valve could, if desired, be situated at any other convenient location and communicated with the reservoir by means of another duct. For example, those skilled in the art will recognize that the valve could be built into the so-called dump chamber of a control valve, like the valve 12.

Referring now more particularly to FIGURES 2–4, which illustrate one form of the valve of this invention in different conditions of operation, the valve comprises, in general, a body 18 that provides an annular valve seat 19 and a larger diameter cylinder 20 formed in the body coaxially with the valve seat and which opens forwardly to it. Axially slidable in the body is a main poppet member 21 which is biased forwardly by a compression spring 22 and the front portion of which comprises a valve element 23 that is cooperable with the valve seat 19 to control communication therethrough between a system port 24 in the front end of the body and one or more reservoir ports 25 which open from the interior of the body at the front of the cylinder 20, adjacent to the valve seat 19. The rear portion of the main poppet member 21 comprises a piston 26, which is slidably received in the cylinder 20 and by which the valve element 23 is actuated toward and from engagement with the valve seat.

The valve body 18 is preferably made in two parts, namely, a substantially tubular front member 27 and a plug-like rear member 28. The front body member 27 has a coaxial bore 29 that opens to its front end and a counterbore 30, the medial portion of which provides the cylinder 20 in which the piston 26 is slidable. The valve seat 19, which faces rearwardly or inwardly, is provided by a chamfer at the junction of the bore and counterbore, and the system port 24 comprises the outer portion of the bore 29.

The front end portion of the valve body preferably has a reduced diameter as at 31, so as to be adapted to project outwardly through a hole in the wall of a reservoir in which the valve is mounted, with the major portion of the valve body inside the reservoir, below the normal level of fluid therein. At the junction of its larger and smaller diameter portions the front body member 27 has a circumferential forwardly facing shoulder 32 which is adapted to engage the inner surface of the reservoir wall on which the valve is mounted and to cooperate with a connector 33 (see FIGURE 1), threaded onto the small diameter front end portion 31 of the valve body, in clampingly fastening the valve to the wall. The connector 33 preferably comprises a union which joins a duct 16 to the front end portion of the valve body to thus directly communicate the system port 24 in front of the valve seat 19 with a normally pressurized portion of the system in which the valve is installed.

The reservoir ports 25 open radially outwardly through the valve body to that portion thereof which is behind the shoulder 32 to communicate the counterbore 30 in the valve body with the interior of a reservoir in which the valve is mounted. Hence system pressure is normally manifested at the system port 24 in front of the valve seat, while the static pressure of fluid in the reservoir is manifested at the reservoir ports 25 behind the valve seat and in front of the piston 26.

The rear body member 28 is threaded into the rear end portion of the counterbore 30 in the front body member 27, and an O-ring 34 or the like, confined between the two parts of the valve body, provides a seal between them.

Extending coaxially through the rear body member 28 is an outlet passage 35 which provides for venting that portion of the cylinder 20 which is behind the piston 26 into a reservoir in which the valve is mounted. However, fluid is normally prevented from flowing out of this outlet passage by a pilot poppet 36, which is axially slidable in the rear body member and which is biased forwardly toward engagement with a rearwardly facing seat 37 by means of a compression spring 38. The rear body member has a short forwardly opening coaxial bore 39 therein and a rearwardly opening counterbore 40 that extends through the major portion of its length. The pilot valve seat 37 is defined by the junction of this bore and counterbore, and the pilot poppet is slidable in the front portion of the counterbore, while a substantially tubular spring seat member 41 is threaded into the rear or outer end portion of the counterbore.

The pilot poppet 36 has a cylindrical rear portion that has a substantially loose sliding fit in the counterbore 40 in the rear body member, and has a coaxial front portion of substantially smaller diameter which terminates in a frustoconical valve element 43 that is adapted to engage the rearwardly facing pilot valve seat 37. Since the rear portion of the poppet member would substantially restrict flow of fluid through the outlet passage 35, a portion of the outlet passage extends through the pilot poppet itself, and specifically the poppet has a coaxial bore 44 that extends forwardly from the bottom of a coaxial rearwardly opening well 45 in its rear portion, partway into the reduced diameter front end portion of the poppet, and has ports 46 which open radially outwardly from the bore 44 directly behind the frustoconical valve element. The rear portion of the outlet passage 35 is provided by a rearwardly opening bore 47 and a coaxial forwardly opening counterbore 48 in the spring seat member 41.

The well 45 in the rear portion of the pilot poppet receives the front convolutions of the helical compression spring 38 which biases the pilot poppet forwardly, while the rear convolutions of said spring are received in the counterbore 48 in the spring seat member. The threaded connection between the spring seat member and the rear body member 28 permits axial adjustment of the spring seat to effect regulation of the force which the spring 38 exerts against the pilot poppet, and thus provides for accurate adjustment of the high pressure value at which the valve opens. To facilitate such axial adjustment of the spring seat member it may have a screw driver cross slot 49 at its outer end, and a lock nut 50 can be threaded onto its projecting rear portion and engaged against the rear face of the rear body member 28 to hold the spring seat against displacement out of any position of axial adjustment in which it may be set.

The main poppet member 21, which comprises the valve element 23 and the piston 26, is preferably formed with a rearwardly opening well 51 therein, the bottom of which serves as a seat for the bias spring 22 by which the main poppet member is urged forwardly to a normal position (illustrated in FIGURE 2) in which the valve element 23 is engaged with the valve seat 19 to block communication between the system port 24 and the reservoir ports 25. A reduced diameter front end portion 52 on the rear body member 28 projects forwardly into the well 51 in the main poppet member and pilots the spring 22, which reacts against a forwardly facing abutment 54 in the valve body, provided by the front face of the larger diameter rear end portion of the rear body member. The provision of the well 51 in the main poppet member and the forwardly projecting portion 52 on the rear body member not only affords coaxial support for the spring 22 in the valve body but also conserves space and keeps the valve axially short.

As will appear hereinafter, the back and forth movements of the piston 26 are controlled by the pressures of fluid in that portion 55 of the cylinder 20 which is behind the main poppet member 21, and hence the portion 55 of the cylinder may be regarded as a pressure chamber. The valve element 23 is formed on a portion of the main poppet member which has a smaller diameter than its piston portion 26 and which projects forwardly a substantial distance from the piston portion, so that the piston has a forwardly facing surface 56 which is at all times exposed to the fluid pressure obtaining at the reservoir ports 25. To prevent fluid from flowing around the piston, it may be provided with a piston ring comprising a resilient O-ring 57 or the like seated in a circumferential groove in the piston and compressively confined between it and the cylinder.

Extending coaxially through the main poppet member 21 is a passage 58, a portion of which is defined by a plunger 59 which is slidable in a coaxial bore 62 in the main poppet member and which serves to prevent chattering of the valve during high pressure relief operation, as explained hereinafter. Through the passage 58 fluid is permitted to flow more or less freely forwardly out of the pressure chamber 55, but a ball check valve element 60 carried by the main poppet member cooperates with the front end of the plunger 59 to permit only a restricted flow of fluid rearwardly through said passage.

The passage 58 through the main poppet member is conjointly defined by the plunger 59 and the main poppet member itself by reason of the fact that the plunger has a forwardly opening coaxial bore 63, and small passages 64 in the main poppet member open outwardly from the front end of its bore 62 to communicate with the bore 29 in the front of the valve body, while small radial ports 65 in the plunger, spaced from its rear end, communicate the bore 63 therein with the pressure chamber 55.

It will now be apparent that the piston at all times tends to be moved forwardly, in the direction to engage the valve element 23 against the seat 19, by the biasing force of the compression spring 22 and by the force which fluid in the pressure chamber 55 exerts against its rear face, and it tends to be moved rearwardly by the force which fluid in the bore 29 exerts upon the front end portion of the main poppet member and the force which fluid at the reservoir ports 25 exerts upon the front face 56 of the piston.

When normal operating conditions exist in a hydraulic system in which the valve is installed, fluid pressure in the bore 29 is above the negative pressure value at which the valve is adapted to open for vacuum relief, but is below its predetermined high pressure relief value and the pilot poppet 36 remains in engagement with its seat 37, as illustrated in FIGURE 2. Under these conditions, fluid in the pressure chamber 55 has substantially the same pressure as fluid in the bore 29, due to the fact that there is a restricted bleed passage 68 in the main poppet member through which fluid can be bypassed around the ball check 60 when the latter is seated. This bleed passage may be provided by a small bore which opens radially from the interior of the plunger to the exterior of a slightly reduced diameter front end portion on the plunger.

Under the normal operating conditions just described, with fluid pressures substantially equal at axially opposite sides of the main poppet member 21, the fluid exerts a net forward force upon the main poppet member which supplements the forward biasing force of the spring 22 in maintaining the valve element 23 engaged with the seat 19. This is due to the fact that the area of the rear face of the piston is substantially greater than the area of the front face of the valve element 23.

When the pressure of fluid in the bore 29 rises above the high pressure relief value, the pressure of fluid in the pressure chamber 55 likewise rises, due to the communication between the pressure chamber and the bore 29 afforded by the passage 58, and such fluid pressure exerted upon the front face of the pilot poppet 36 overcomes the biasing force of the spring 38, moving the pilot poppet off of its seat, as illustrated in FIGURE 3. As soon as the pilot poppet is unseated, fluid begins to flow rearwardly through the outlet passage 35, venting the pressure chamber 55 into the reservoir. The main poppet member then moves rearwardly, against the bias of compression spring 22, in response to the pressure of fluid in the bore 29 exerted upon the valve element 23, and the valve element is thus carried off of its seat 19 to permit fluid to flow from the pressure system into the reservoir.

It will be observed that under the conditions just described the ball check valve element 60 is held seated against the tubular front end portion of the plunger 59, and the rate at which fluid flows from the bore 29 to the pressure chamber 55 through the bleed passage 68 is substantially less than the rate at which it flows out of the pressure chamber through the outlet passage 35. Not only is the main poppet member held off its seat, as illustrated in FIGURE 3, as a result of the pressure differential thus maintained across it, but the tubular plunger 59 is likewise held in a rearward position as a result of the rearward flow of fluid through the passage 58 and by the difference between the fluid pressures at its front and rear faces, and the plunger therefore holds the pilot poppet unseated until fluid pressure in the bore 29 falls to a value which is too low to overcome the biasing force of the pilot poppet spring 38, so that the latter is able to reseat the pilot poppet. Thereupon the fluid which bleeds back into the pressure chamber 55 through the passage 58, supplemented by the biasing force of the compression spring 22, returns the main poppet member to its normal position of engagement with its seat 19.

It will be noted that the bleed passage, by its restriction of flow into the pressure chamber, affords a sort of dash pot effect which prevents hunting of the main poppet member as system pressures decline to values near the high pressure relief value. To further insure against chattering and hunting, the plunger 59 has a cross sectional area which is not substantially smaller than that of the pilot poppet seat 37, and which is preferably slightly greater.

When pressure of fluid in the bore 29 falls to a negative value, the ball check valve element 60 is unseated as fluid is drawn forwardly through the passage 58 from the pressure chamber 55. This condition is illustrated in FIGURE 4. The passage 58 then provides for substantially unrestricted venting of the pressure chamber by which fluid pressure in the latter is rapidly brought down to the same negative value as obtains in the system. Since pressure at the reservoir ports 25, exerted upon the front face 56 of the piston, is then higher than the pressure exerted upon its rear face by the fluid in the pressure chamber, the piston moves rearwardly in response to this pressure differential against the bias of the spring 22, allowing fluid from the reservoir to flow into the system through the valve seat 19.

The plunger 59 will of course tend to move forwardly relative to the main poppet member 21, in response to the forward flow of fluid out of the pressure chamber, but it will be stopped short of a position at which it reengages the ball 60 by the engagement of a forwardly facing abutment 69 on its rear portion with the rear face 70 of the main poppet member.

When pressure in the system rises back to normal positive values, the ball check 60 is reseated as fluid bleeds back into the pressure chamber 55 through the bypass or bleed passage 68. In addition, the plunger 59 moves rearwardly relative to the main poppet member in response to the difference between pressure in the bore 29 and that in the pressure chamber, until the rear end of the plunger contacts the pilot poppet. Such rearward movement of the plunger of course displaces fluid in the pressure chamber and helps to bring the pressure therein rapidly back up to a value at which the main poppet member can move forwardly to reseat the valve element 23, even though the rearward flow of fluid into the pressure chamber is relatively slow due to the seating of the ball check 60. Thus the valve of this invention not only opens very quickly and positively as soon as negative pressure is manifested at the system port, but also closes very quickly and firmly as soon as such negative pressure is relieved.

The embodiment of the invention illustrated in FIGURE 5 affords a very compact relief valve, suitable for incorporation in a control valve, and in fact the control valve body can comprise the front member 127 of the relief valve body 118, in which an exhaust passage having the return duct 13 communicated therewith provides the reservoir port or ports 25 and the bore 29 may communicate with the service passage having the duct 15 connected therewith, so that the bore 29 provides the system port 24. The rear body member 128, which is cup-shaped, is threaded or otherwise secured in the control valve body and defines a forwardly opening well that provides the cylinder 20 in which the piston portion 126 of the main poppet member 121 is slidable. In this case the pilot poppet 136 is carried by the main poppet member, and the vent or outlet passage 135 which the pilot poppet controls is likewise located in the main poppet member and communicates with the return line or reservoir port 25.

The compression spring 22 that biases the main poppet member forwardly is confined between the bottom of the cylinder well 20 in the rear body member 128 and the rear face of the main poppet member, and it and the main poppet member must of course be inserted into the rear body member before the latter is assembled to the control valve or other structure providing the front body member 127.

At its front the main poppet member 121 has a reduced diameter coaxial extension 180 that projects forwardly into the bore 29 in the valve body. The main poppet member is tubular, having a small diameter coaxial bore 164 opening to the front end of its extension 180, a larger diameter counterbore 181 which extends through a substantial part of its forward extension 180 and rearwardly into the front end of its piston portion 126, and a still larger rearwardly opening counterbore 182. The junction of the largest and intermediate sized counterbores defines a rearwardly facing annular shoulder which provides a seat 137 for the pilot poppet 136. The rear end of the larger counterbore 182 is plugged, preferably by a screw 195 that provides an axially adjustable seat for the compression spring 138 that biases the pilot poppet forwardly onto its seat 137.

The main poppet member also has an obliquely rearwardly inclined bore 183 that intersects the smaller diameter counterbore 181 intermediate its ends and which opens to one side of the extension 180 on the main poppet member and to a rearwardly extending drilled passage 184 that is parallel to but spaced to one side of the axis of the main poppet member. The outlet passage 135 is defined by the drilled passage 184, the inner portion of the obliquely inclined bore 183, the rear portion of the smaller diameter counterbore 181, the larger diameter counterbore 182, and a radial bore 185 that opens laterally from the larger counterbore 182 near the front thereof. To assure communication between the reservoir port 25 and the mouth of the radial outlet 185, the cylinder portion of the main poppet member is provided with a flat 186 at its side to which said radial bore opens, extending forwardly a distance from the mouth of the radial bore.

Fluid pressure at the system port 24 is transmitted to the portion of the cylinder 20 which is behind the piston 126 through the inclined bore 183 and the eccentric rearwardly extending passage 184 to which it opens. Such pressure is also transmitted to the front face of the pilot poppet through the outer portion of the inclined bore 183 and the rear portion of the smaller diameter counterbore 182.

Slidable in the smaller diameter counterbore 181 in the poppet member is a plunger 159 which has a head portion 187 at its front that loosely slidably fits the counterbore 181, and has a smaller diameter coaxial stem 188 extending rearwardly from its head portion to provide a motion transmitting connection with the pilot poppet. The plunger 159 holds the pilot poppet open after it is unseated by excessively high pressure at the stem port 24, functioning in the same manner as the plunger 59 in the previously described embodiment of the invention. In addition, the plunger 159 serves as a throttling valve that restricts the passage 183—184 during normal high pressure operation of the valve but leaves said passage substantially unrestricted when a negative fluid pressure is manifested at the system port. To this end the axial lengths of the head and stem of the plunger are so chosen that its head portion lies athwart the inclined bore 183 at all times that positive pressures above the relief valve setting are manifested at the system port and the plunger is forced rearwardly to maintain the pilot poppet unseated. The head then partially blocks the inclined bore 183 to restrict flow of fluid from the system port to the rear end of the cylinder 20. However, when the plunger 159 is drawn forwardly by negative pressure at the system port, to a position in which its head engages the rearwardly facing shoulder defined by the junction of the small diameter bore 164 and the smaller counterbore 181, the head is clear of the inclined passage 183, and fluid can flow substantially freely therethrough.

In general, therefore, the operation of the valve shown in FIGURE 5 is similar to that of the valve illustrated in FIGURES 2–4.

The valve illustrated in FIGURES 6–8 is generally similar to that of FIGURE 5, particularly in that its front body member 127 can comprise the body of a control valve in which the relief valve is incorporated, and the pilot poppet 136 is carried by the main poppet member 221. In this case, however, the oblique passage 183' is duplicated and its two branches open to diametrically opposite sides of the reduced forward extension on the front of the main poppet member, and the eccentric rearwardly opening passage 184' is likewise duplicated at opposite sides of the axis of the main poppet member, thus assuring hydraulic balance laterally across the main poppet member. In production, of course, this same pressure balancing expedient would be incorporated in the valve of FIGURE 5, and its outlet 184 would be relocated accordingly.

The valve of FIGURES 6–8 also incorporates provision for adjustment of the biasing force of the pilot poppet spring 138 for regulation of the value of high pressure at which the valve relieves, without the need for disassembling the unit. To this end the seat for the rear end of the pilot poppet spring comprises a plug or screw 295 which closes the rear end of the larger diameter counterbore 182 in the main poppet member and which has a large bifurcated head 189. The rear body member 228 is tubular, and is closed at its rear end by an externally threaded tubular plug 141 in which an adjusting member 190 is rotatably engaged. The adjusting member has a blade-like non-circular forward projection 192 which is received between the bifurcations of the head 189 on the spring seat plug 295 so that the latter can be axially adjusted relative to the main poppet member by rotation of the adjusting member 190, thereby allowing the biasing force exerted by the pilot poppet spring 138 to be readily changed. To facilitate such adjustment the adjusting member may be provided at its outer end with a screw driver cross slot 193 or the like.

Intermediate its ends the adjusting member has a flange-like head 194 which provides a rearwardly facing circumferential shoulder that engages the front face of the plug 141 and a forwardly facing spring seat for the compression spring 22 by which the main poppet member is biased forwardly. The rear end portion of the adjusting member is screw threaded to receive a lock nut 150 which holds the adjusting member against rotational displacement and cooperates with the flange-like head 194 to confine it against axial motion. An O-ring 197 confined in a circumferential groove in the adjusting member serves as a gland which prevents leakage of fluid out of the plug 141.

In the two valves illustrated in FIGURES 5–8, inclusive, the seat 119 on the body of the control valve, against which the main poppet member engages, is machined to flatness by spot facing, rather than having a frustoconical taper as has heretofore been the general practice, and the main poppet member has a correspondingly flat front face. It has been found that this arrangement provides a highly satisfactory trouble-free seal when the main poppet member is seated, and the flat front surfaces resist wear to a much greater extent than the frustoconical valve and seat surfaces having line contact, such as have heretofore been common.

The relief valve illustrated in FIGURES 9 through 12 has been shown provided with a body structure 328 like that of the FIGURE 6 embodiment of the invention, to adapt it for mounting on a control valve 329. It will be appreciated, however, that it could as well have a body like that of the first described embodiment of the invention to make the valve mechanism independent of the supply and return passages of the control valve and of the port 330 that provides for communication between said passages.

The valve of FIGURES 9 through 12 likewise has a piston-like main poppet mechanism 331, the front of which projects from the cylinder 332 provided by the body, and across the return line provided by the exhaust passage 333 in the control valve body, for cooperation with the seat provided by the port 330. Similarly, it is responsive to excessive pressure in the supply line provided by the service passage 334 of the control valve to effect flow of high pressure fluid from the supply line to the return line 333, and it responds to a low or subatmospheric pressure condition in the supply line to effect flow of reservoir fluid from the return line to the supply line to preclude drawing a void in mechanism such as a hydraulic cylinder that may be connected with the motor port 335 through which the service passage 334 opens.

In the combined relief and void control valves described hereinbefore, both relief functions of the valve were achieved by a single poppet movable toward and from engagement with but one valve seat. The valve of FIGURES 9 through 12, however, is characterized by a main poppet mechanism 331 which is comprised of two poppets, namely, an inner high pressure poppet 336 like that of the FIGURE 6 embodiment and similarly containing a pilot poppet 337, and a concentric outer sleeve-like void control poppet 338 in which the high pressure poppet is received for bodily motion with the void control poppet and for axial sliding motion relative thereto.

The sleeve-like void control poppet 338 has a short axial bore 339 in its front which is adapted to register with the system port 330, and which bore opens rearwardly to the bottom of a long counterbore 340 in which all but a slightly enlarged rear portion 341 on the high pressure poppet is slidably received to be guided thereby for axial sliding motion relative to the void control poppet. The enlargement 341 on the rear of the inner poppet is received in a rearwardly opening enlargement 342 of the counterbore 340. There is no obstruction on the outer poppet 338, that interferes with independent rearward motion of the inner poppet 336 into the cylinder.

The portion 345 of the outer poppet which projects forwardly out of the body may be of uniform diameter, and its forward extremity is endwise sealingly engageable with the seating surface surrounding the system port 330 as in the FIGURE 6 embodiment of the invention. This front portion 345 of the outer poppet loosely fits the front portion of the body, with substantial clearance space 345' between its exterior and the wall of the bore in the body, and it is joined to a larger diameter rear portion 346 on the outer poppet that is received in a counterbore 347 that defines the cylinder or chamber 332 in which fluid under pressure is normally maintained to hold the poppet mechanism comprised of both poppets in their forward positions.

In this normal condition of the mechanism, the front of the inner or high pressure poppet 336 has endwise sealing engagement with the valve seat 348 provided by the bottom of the counterbore 340 in the outer poppet, so that it closes the short bore 339 in the front of the outer poppet and cooperates with the latter in closing the system port 330.

The short bore 339 in the front of the outer poppet also provides the inlet end of a relief passage through which fluid at excessively high pressure in the supply line 334 may flow to the return line 333 whenever the inner or high pressure poppet is caused to move rearwardly, to an open position displaced from its seat 348, in consequence of unseating of the pilot poppet 337 in its interior. The outlet of this relief passage comprises the forward end portion of the counterbore 340 in the outer poppet, and one or more radial holes 350 in its side wall located immediately behind the relief valve seat 348 and in position to communicate with the return passage 333. The holes 350 also provide outlet end portions for the cylinder vent passages 351, as will be apparent from FIGURES 10 and 12.

FIGURE 10 shows the axial positions of the inner and outer poppets relative to one another and to their respective seats when the valve is relieving excessive pressure in the supply line. As therein seen, the pilot poppet has opened in consequence of such excessive pressure to allow some of the fluid to escape from the cylinder space behind the inner poppet, while fluid under pressure in the system port 330 has moved the inner poppet rearwardly off of its seat 348. This, of course, allows high pressure fluid from the supply line 334 to flow to the return line 333, through the bore 339 and the radial ports 350 in the side wall of the outer poppet. Though the throttling plunger 353 in the forwardly extended nose 354 on the inner poppet is now in a throttling position, the pressure of fluid in the cylinder 332 will nevertheless be maintained at a value sufficient, by the restricted communication it then has with the supply line or system port, to preclude rearward motion of the outer poppet off of its seat. Hence, during relief of excessively high pressures in the supply line, only the inner poppet moves rearwardly off of its seat, while the outer poppet remains seated.

FIGURE 11 shows the axial positions of the inner and outer poppets relative to their seats when the valve is performing its void prevention function at which time fluid from the return line is caused to flow to the supply line. At such times, the inner poppet remains engaged with its seat 348, and the entire poppet mechanism is moved rearwardly, bodily as a unit, into the cylinder to effect direct communication between the supply and return lines through the system port 330. The throttling plunger 353 is in its forward non-restricting position permitting rapid evacuation of fluid from the cylinder 332 to reduce the pressure therein to a value below that of the pressure of fluid in the return line so that the pressure in the return line 333 may act upon the forwardly facing shoulder 356 on the front of the enlarged rear of the outer poppet, through the clearance space 345', to push the outer poppet rearwardly out of its port closing position.

Certain advantages result from the relief valve mechanism disclosed in FIGURES 9 through 12. It is better adapted for use with fluid pressure operated mechanisms wherein high rates of fluid flow are essential. More important, is the fact that by a single hardening operation performed on the front end portion of the outer or void control poppet, the forward or seat engaging end of the poppet may be hardened to a desirable degree, as well as the seat 348 for the high pressure inner poppet. This, of course, assures long life for the poppet mechanism.

From the foregoing description taken together with the accompanying drawings, it will be apparent that this invention provides a compact, inexpensive and dependable relief valve which is particularly suited for use in hydraulic systems and which is adapted to open when the pressure of fluid in the system rises to a predetermined high pressure value and also when such pressure falls to a value below the pressure of fluid in the return or reservoir line of the system. It will also be apparent that the valve of this invention opens and closes with a smooth, positive, chatter-free action when relieving both high pressures and negative pressures, is readily adjustable to open at an accurately predeterminable high pressure value, and can be readily installed in a wall of a reservoir of a hydraulic system or can easily be built into a control valve or other unit intended for installation in such a system.

What is claimed as my invention is:

1. A pilot operated valve for relieving both high pressures and negative pressures in a hydraulic system or the like, comprising: a hollow valve body defining a cylinder, a reservoir port opening from the front end portion of the cylinder and which may be communicated with a source of fluid at low pressure, a system port connectable with a portion of a hydraulic system in which varying fluid pressures may be manifested and communicating with the front end portion of the cylinder through an annular rearwardly facing valve seat, and an outlet opening from the rear end portion of the cylinder; a main poppet member slidable back and forth in the body and providing a piston received in said cylinder and a smaller diameter valve element connected with the front of the piston and engageable with the valve seat in a forward position of the main poppet member to block communication through the valve seat between the system port and the reservoir port, said main poppet member being biased forwardly to normally maintain the valve element in its said forward position; means in the valve body defining a pilot poppet including a poppet element which is yieldingly biased to a closed position blocking the outlet; a pressure responsive plunger extending axially through the main poppet member and movable back and forth relative thereto, said plunger being adapted to be moved rearwardly in response to pressure of fluid at the system port; cooperating means on the plunger and the poppet element providing a motion transmitting connection between them whereby rearward movement of the plunger aids movement of the poppet element out of its closed position, to thus vent fluid through the outlet, out of the rear portion of the cylinder, so that the main poppet member can move out of its said forward position in response to pressure of fluid at the system port exerted upon the valve element; means in the main poppet member defining a passage extending axially therethrough by which fluid can flow forwardly out of the rear portion of the cylinder in response to negative pressure of fluid at the system port, so that the main poppet member can move out of its said forward position in response to the pressure of fluid at the reservoir port manifested on the front of the piston; and check valve means in the main poppet member permitting substantially free flow of fluid forwardly through said passage but responsive to rearward flow of fluid through said passage to restrict the same.

2. The valve of claim 1, wherein said passage defining means comprises a tubular front portion of the plunger which is received in the main poppet member; wherein said check valve means comprises a valve element carried by the main poppet member for back and forth movement toward and from engagement with the front end of the plunger; and wherein a small hole in the tubular front portion of the plunger provides restricted communication between the interior thereof and the system port at times when said valve element is engaged with the front end of the tubular front portion of the plunger.

3. A pilot operated valve for relieving both high pressures and negative pressures in a hydraulic system or the like, comprising: a hollow valve body defining a cylinder, a reservoir port opening from the front end portion of the cylinder, and a system port communicating with the front end portion of the cylinder through a rearwardly facing annular valve seat; means providing an outlet opening from the rear end portion of the cylinder; a main poppet member slidable back and forth in the valve body and yieldingly biased forwardly, said main poppet member comprising a piston in said cylinder and a valve element connected to the front of the piston and normally held engaged with the valve seat by the forward bias on the main poppet member to block communication through the valve seat between said ports, said main poppet member having a reduced forward portion defining a forwardly facing shoulder accessible to fluid at the reservoir port; pilot poppet means in the valve body biased to a normally closed position blocking said outlet and movable out of said position to permit fluid to be vented from the rear portion of the cylinder, behind the piston; said valve having a passage through which fluid can flow forwardly from behind the piston to the system port when pressure of fluid at the system port falls below that at the reservoir port, to allow the main poppet member to move rearwardly in response to fluid pressure at the reservoir port exerted upon said forwardly facing shoulder; and pressure responsive check valve means in said passage for restricting rearward flow through the same so that when the pilot poppet means is out of its closed position fluid flows through said passage from the system port to the rear portion of the cylinder at a rate less than that at which fluid is vented through the outlet, to thus prevent chatter of the valve element at such times.

4. The valve of claim 3, further characterized by the fact that said passage extends axially through the main poppet member.

5. A pilot operated valve for relieving both high pressures and negative pressures in a hydraulic system or the like, comprising: a hollow valve body defining a cylinder, a reservoir port opening to the front end portion of the cylinder, and a system port communicating with the front end portion of the cylinder through an annular rearwardly facing valve seat; a main poppet member in the valve body comprising a piston slidable back and forth in the cylinder behind the reservoir port and a valve element movable with the piston toward and from engagement with the rear face of the valve seat, said main poppet member having a reduced forward portion defining a forwardly facing circumferential shoulder accessible to fluid at the reservoir port, and being biased forwardly to normally maintain the valve element engaged with the valve seat; means defining an outlet opening from the rear portion of the cylinder through a second valve seat; pilot poppet means in the valve body biased toward engagement with said second valve seat to block flow of fluid through the outlet; a plunger movable relative to the valve body and the main poppet member and having a motion transmitting connection with the pilot poppet means, said plunger having a portion exposed to fluid in front of the first designated valve seat so as to be moved by the pressure of such fluid in a direction to hold open the pilot poppet means when fluid pressure at the system port attains a predetermined high value, thus allowing fluid in the rear portion of the cylinder, behind the piston, to be vented through the outlet, so that the main poppet member can move rearwardly in response to the force which pressure fluid at the system port exerts upon the valve element; means defining a passage by which fluid can flow out of the rear portion of the cylinder, from behind the piston, to the front of the first designated valve seat when negative pressure is manifested at the system port, so that the piston can then move rearwardly in response to pressure which fluid at the reservoir port exerts upon said shoulder on the main poppet member; and throttling check valve means in said passage means for restricting flow of fluid rearwardly therethrough, so as to prevent chatter of the main poppet member when the pilot poppet means is open.

6. A pilot operated valve for relieving both high pressures and negative pressures in a hydraulic system or the like, comprising: a substantially tubular front body member having a forwardly opening bore, a counterbore, and a port opening to the front portion of the counterbore, adjacent to its junction with the bore, said junction defining a rearwardly facing valve seat and the medial portion of the counterbore providing a cylinder; a rear body member having a rear portion which sealingly closes the rear of the counterbore in the front body member and a smaller diameter coaxial front portion projecting forwardly into the cylinder, said rear body member having a short forwardly opening bore and a counterbore extending through the major portion of its length, the junction of said bore and counterbore providing a rearwardly facing pilot poppet seat; a main poppet member comprising a piston portion snugly slidably received in the cylinder and a coaxial smaller diameter forwardly projecting portion providing a valve element engageable with the valve seat, said main poppet member having a rearwardly opening well therein of substantially larger diameter than the front portion of the rear body member and a coaxial bore opening to the bottom of said well and to the front of the valve element; a coiled compression spring concentrically surrounding the smaller diameter front portion of the rear body member and reacting between its rear portion and the bottom of the well in the main poppet member to bias the latter forwardly and thus normally maintain the valve element engaged with the valve seat; a pilot poppet slidably received in the counterbore in the rear body member for forward and backward movement toward and from engagement with the pilot poppet seat; means in the rear portion of the counterbore in the rear body member providing a spring seat which is normally fixed with respect to the valve body; a coiled compression pilot spring reacting between said spring seat means and the pilot poppet to bias the latter forwardly and thus normally maintain it engaged with the pilot poppet seat; a plunger axially slidably received in the bore in the main poppet member and having a rear end portion engageable with the front of the pilot poppet to transmit rearward movement of the plunger to the pilot poppet, said plunger having a coaxial forwardly opening bore therein through which the bore in the front body member is communicable with the portion of the cylinder which is behind the main poppet member, and having a small hole therein to restrictedly communicate its bore with that of the front body member; and a movable check valve element in the main poppet member engageable with the front end of the plunger to prevent flow of fluid rearwardly into the plunger bore except through said small hole, and thus render the plunger responsive to high fluid pressure in the bore in the front body member, so that the plunger holds the pilot poppet rearwardly off of the pilot poppet seat so long as such pressure is above a predetermined high value, said check valve element being movable away from engagement with the plunger in response to negative pressure in said bore, to thus permit substantially unrestricted forward flow of fluid through the plunger.

7. The valve of claim 6, further characterized by the fact that said spring seat means comprises a tubular member which is axially adjustably threaded into the rear of the counterbore in the rear body member to thus provide for regulation of the biasing force exerted by the pilot spring upon the pilot poppet.

8. The valve of claim 6, further characterized by the fact that said spring seat means comprises a tubular member which has a forwardly opening coaxial well therein; further, by the fact that the pilot poppet has a rearwardly opening coaxial well therein; and further by the fact that end portions of the pilot spring are supportingly received in said wells.

9. The valve of claim 6, further characterized by the fact that the front portion of the front body member has a smaller outside diameter than the rear portion thereof so as to be projectable through a wall of a reservoir or the like; and further characterized by the fact that said front body member has a forwardly facing circumferential shoulder at the junction of its front and rear portions adapted to engage a surface of a wall in which the valve is mounted.

10. A pilot operated valve for relieving both high pressures and negative pressures in a hydraulic system or the like, comprising: a hollow valve body defining a cylinder, a reservoir port opening from the front of the cylinder and connectable with a source of fluid at low pressure, and a system port connectable with a portion of a hydraulic system in which varying fluid pressures may be manifested and communicating with the front end of the cylinder through an annular rearwardly facing valve seat; a main poppet member slidable back and forth in the valve body and providing a piston received in said cylinder and a smaller diameter valve element connected with the front of the piston, said main poppet member being biased forwardly to normally maintain the valve element in a forward position in which it is engaged with the valve seat to block communication through the valve seat between the system port and the reservoir port, and said main poppet member having a pair of passages which are communicable with an outlet in the main poppet member opening to the reservoir port through a second rearwardly facing valve seat, one of said passages leading to the cylinder space behind the piston and the other leading to the system port; a pilot poppet carried by the main poppet member for back and forth motion relative to the latter and yieldingly biased forwardly into engagement with said second valve seat; a plunger slidable back and forth in the main poppet member and having a motion transmitting connection with the pilot poppet by which the latter is held off of its seat in response to fluid pressure at the system port in excess of a predetermined value; and means on the plunger providing a throttling valve cooperating with said other passage, and responsive to the difference between fluid pressures at the system port and the reservoir port to be moved thereby to a position restricting flow of fluid from the system port to said outlet when pressure at the system port exceeds a predetermined value, and to a position allowing substantially free flow of fluid from the portion of the cylinder which is behind the piston to the system port when fluid pressure at the system port is lower than that at the reservoir port.

11. A pilot operated valve for a hydraulic system or the like, of the type comprising a hollow valve body that defines a cylinder and has a reservoir port opening from the front of the cylinder for connection with a source of fluid at low pressure and a system port which is communicable with the reservoir port through an annular rearwardly facing valve seat and which is connectable wtih a portion of a hydraulic system in which varying fluid pressure may be manifested, said valve also having a main poppet which is engageable with the valve seat and the rear portion of which comprises a piston slidable in the cylinder, the front portion of the main poppet being reduced to provide a forwardly facing circumferential shoulder thereon accessible to fluid at the reservoir port, and a pilot poppet yieldingly biased into engagement with another seat within the valve body through which fluid can flow out of said cylinder from behind the piston, said pilot operated valve being characterized by: means defining a passage communicating the system port with a portion of said cylinder which is behind the piston, so that fluid can flow out of the cylinder through said passage when pressure at the system port is below that at the reservoir port, thus causing the main poppet to be moved away from the first designated seat in consequence of the force which pressure fluid at the reservoir port exerts upon said forwardly facing shoulder on the main poppet; a plunger within the valve body movable back and forth relative to the valve body and the main poppet and having a motion transmitting connection with the pilot poppet, by which the pilot poppet is held off of said other seat, against its bias, so long as fluid pressure at the system port exceeds a predetermined high value; and throttling check valve means in said last named passage, responsive to differences between the pressures of fluid at the system port and in the cylinder behind said piston to be moved thereby to a restricting position, throttling flow of fluid through said last-named passage, when pressure at the system port is higher, and to an open position leaving said passage substantially unrestricted when pressure in said cylinder behind the piston is higher.

12. The pilot operated pressure relief valve of claim 11, wherein said last named passage is defined by a coaxial bore in the main poppet and a second bore in the main poppet which is obliquely inclined to the coaxial bore, which intersects the coaxial bore, and which opens forwardly to the system port, and wherein the plunger is slidable in the coaxial bore in the main poppet, further characterized by the fact that: the throttling valve comprises an enlarged cylindrical head portion on the plunger that partilaly blocks the obliquely inclined bore in its restricting position but is clear of said obliquely inclined bore in its open position.

13. The pilot operated pressure relief valve of claim 11, wherein the plunger is slidable in a coaxial bore in the main poppet and itself has an axial bore which defines said last named passage and which opens to its front end and to an outlet near its rear end, further characterized by the fact that: said throttling check valve comprises a poppet movable back and forth in the front end portion of said bore in the main poppet, toward and from a restricting position engaged with the front end of the plunger to obstruct the bore therein.

14. In a pilot operated valve of the type comprising a body that defines a cylinder and having a main valve element with a piston at its rear which is slidable in the cylinder toward and from a forward position in which the valve element is normally maintained by pressure of fluid in the cylinder behind the piston and in which the main valve element engages a valve seat in the body to block communication between a reservoir port opening from the front of the cylinder and a system port opening from the interior of the body in front of the valve seat, wherein the front portion of the main valve element is reduced to provide a circumferential shoulder upon which pressure fluid at the reservoir port may act to unseat the main valve element whenever the pressure of fluid at the system port drops below that of fluid at the reservoir port, and wherein a pilot poppet controls communication between the portion of the cylinder behind the piston and an outlet from the valve body, and a pressure responsive plunger slidable in a coaxial bore in the main valve element opening to the system port maintains the pilot poppet unseated so long as fluid pressure at the system port exceeds a predetermined high value, means rendering the valve efficient for relieving negative fluid pressures at the system port as well as high pressures at that port, said means comprising: throttling check valve means in said coaxial bore in the main valve element movable to a position restricting flow of system port fluid through said bore in response to fluid pressure at the system port which exceeds that in the rear portion of the cylinder, and to a position permitting substantially unrestricted flow through said bore to the system port in response to fluid pressure at the system port which is below that in the rear portion of the cylinder and at the reservoir port.

15. The pilot operated valve of claim 14, further characterized by the fact that said throttling check valve means comprises said pressure responsive plunger.

16. In a combined relief and void control valve mechanism for fluid pressure operated systems having a high pressure fluid supply line, a return line containing fluid at low pressure, and a port through which fluid at excess pressure may flow to the return line, which mechanism includes a pilot poppet that is caused to open in consequence of an increase in pressure in the fluid supply line to a predetermined high limit, and a main poppet which is movable in consequence of opening of the pilot poppet and under the influence of supply line pressure, from a normal operating position blocking the flow of fluid through said port from the supply line to the return line, to a relief position permitting such flow, characterized by: a hollow valve body containing the main poppet and the pilot poppet, the main poppet having a forward end portion for engagement with said port, and having a larger rear end portion disposed within the body, and the space within the body rearwardly of the main poppet defining a cylinder having a vent that is normally closed by the pilot poppet; means providing a control passage having its mouth at the front of the main poppet and leading rearwardly to said cylinder space, by which the pressure of fluid in the supply line can be manifested in said cylinder space and imposed upon the rear of the main poppet to normally maintain it in port closing position, said control passage providing for evacuation of fluid from said cylinder space in the event of pressure drop in the supply line to a value below the pressure of fluid in the return line; means on the main poppet defining a surface upon which fluid in the return line may act to move the main poppet to relief position in consequence of evacuation of said cylinder space to allow fluid from the return line to flow to the supply line; and means defining a pressure sensitive throttling valve for said control passage, which is caused to assume a non-restricting position with respect to the control passage whenever the pressure in said cylinder space is greater than that at the mouth of the passage to facilitate evacuation of said cylinder space, and is caused to assume a passage restricting position in response to the flow of fluid through said passage that occurs when the pilot poppet opens.

17. In a relief valve for relieving both high pressures and abnormally low pressures in a fluid pressure operated system having a high pressure supply line, a return line containing fluid at low pressure, and a port through which fluid at excess pressure in the supply line may flow to the return line: structure defining a cylinder having a vent passage through which fluid in the cylinder may be exhausted, and piston means having a rear portion in said cylinder upon which fluid under pressure in the cylinder may act to move the piston means to a forward position relative to the cylinder; a pilot poppet normally closing said vent passage and responsive to the pressure of fluid in said cylinder to be opened thereby when said pressure rises to a predetermined high value to vent the cylinder; said piston means affording a high pressure relief poppet that is movable rearwardly from a port closing position to a relief position at which it permits the flow of high pressure fluid from the supply line to the return line, as a consequence of opening of the pilot poppet, and said piston means affording a void control poppet that is adapted to be moved rearwardly by fluid at low pressure in the return line whenever the cylinder is evacuated, from a port closing to a port opening position at which it permits fluid to flow from the return line to the supply line; means defining a control passage having its mouth at the front of said high pressure relief poppet and leading rearwardly to said cylinder, said control passage providing for the flow of pressure fluid from the supply line to the cylinder, and also to the cylinder vent passage when the pilot poppet is open, and providing for the flow of fluid from the cylinder to the supply line whenever the pressure of fluid in the supply line drops to a value below that in the return line; and means defining a pressure sensitive throttling valve for said control passage, which is moved to a non-restricting position permitting rapid and substantially unrestricted flow of fluid out of the cylinder to the supply line whenever the pressure in the latter drops to a value below the pressure of fluid in the return line, and which throttling valve is moved to a restricting position with respect to the control passage in response to the flow of fluid therethrough that occurs when the pilot poppet opens, to permit fluid to flow at a slow rate from the supply line to the cylinder vent passage.

18. The relief valve of claim 17, further characterized by means lightly biasing said throttling valve to a non-restricting position.

19. The relief valve of claim 16 wherein said throttling valve comprises a plunger carried by the forward portion of the main poppet mechanism and slidable fore and aft relative thereto, from a position obstructing the mouth of the control passage to restrict fluid flow thereinto, to a non-obstructing position permitting substantially free flow of fluid from the cylinder out of the mouth of the control passage.

20. The relief valve of claim 16, wherein the pilot poppet is coaxial with the main poppet and has an annular seat which is formed at the inner end of a hole that extends coaxially forwardly into the main poppet; wherein the control passage crosswise intersects said hole near the mouth of the control passage and at a location forwardly of the pilot poppet seat; and wherein said throttling valve comprises a plunger slidable axially in said hole from a rearward position restricting the control passage at its intersection with the hole to a forward non-restricting position, said plunger having a reduced stem portion projecting rearwardly therefrom to engage the pilot poppet and hold it off of its seat in the rearward position of the plunger.

21. The relief valve of claim 20, further characterized by means in said hole rearwardly of the plunger exerting a light yieldable biasing force on the plunger tending to hold it in its forward position.

22. The relief valve of claim 17, wherein said piston means comprises a substantially cylindrical outer member that provides said void control poppet, and an inner member slidable axially within the cylindrical outer member and providing said high pressure relief poppet; and means on the forward portion of said cylindrical outer member defining an annular rearwardly facing valve seat coaxial with the high pressure relief poppet and with which the forward end of the latter engages in its port closing position, said cylindrical outer member having a hole in its wall rearwardly adjacent to said high pressure poppet seat, through which high pressure fluid from the supply line flows to the return line when the high pressure relief poppet is in its port opening position.

23. In a relief valve of the type having a body and normally closed poppet mechanism having a front portion which is adapted to block transfer of pressure fluid between a high pressure fluid supply line and a low pressure fluid return line in said normally closed position thereof, and wherein pressure fluid at supply line pressure is normally maintained in a chamber in the body, into which the poppet mechanism projects, so that such pressure fluid normally exerts force on a rear portion of the poppet mechanism to hold the same in said closed position thereof, said relief valve being characterized by:
(A) means defining a pair of passages connecting with said chamber and through either of which fluid in the chamber may be substantially freely exhausted to allow the poppet mechanism to be opened under fluid pressure forces exerted upon its front portion, one of said passages providing a control passage that is communicable with the fluid supply line and through which supply line fluid normally flows into said chamber;
(B) a pilot poppet in the body biased to a closed position blocking the other of said passages but movable to a chamber exhausting position in consequence of the force which supply line fluid exerts thereon at times when its pressure rises to a predetermined relief value;
(C) and means providing a throttling valve for said control passage, that is ineffective as long as the pilot poppet is closed, but is rendered operative to substantially restrict the control passage in response to the drop in pressure that takes place in the chamber at times when the pilot poppet opens.

24. A relief valve device for controlling relief passage means connecting a supply line normally containing fluid at high pressure, with a return line containing fluid at low pressure, and of the type having a chamber that is communicable with the supply line, an exhaust passage leading from said chamber, a pilot poppet biased to a closed position blocking said exhaust passage but movable to a chamber exhausting position in consequence of the force which supply line fluid in said chamber exerts thereon whenever its pressure rises to a predetermined relief value, said valve device being characterized by:
(A) a main poppet mechanism upon which pressure fluid in said chamber acts to be held thereby in a normally closed position blocking said relief passage means, said main poppet mechanism comprising valve means upon which supply line fluid may act and which is moved thereby to a position opening said relief passage means whenever the pilot poppet opens to allow fluid to exhaust from said chamber;
(B) means on the main poppet mechanism defining a surface upon which fluid in the return line may act to effect opening of the main poppet mechanism and hence the relief passage means whenever the pressure of fluid in the supply line and the chamber with which it communicates drops to a value below that of fluid in the return line, so as to allow fluid to flow from the return line to the supply line;
(C) means in the valve device providing a control passage to substantially freely communicate said chamber with the supply line except during times when the pilot poppet is open;

(D) and means in the valve device providing a pressure sensitive throttling valve for said control passage, operable to effect substantial restriction of the control passage as a consequence of opening of the pilot poppet.

References Cited in the file of this patent

UNITED STATES PATENTS

| | | |
|---|---|---|
| 781,931 | Schutte | Feb. 7, 1905 |
| 2,827,075 | Mercier | Mar. 18, 1958 |
| 2,989,072 | Banker | June 20, 1961 |